United States Patent Office.

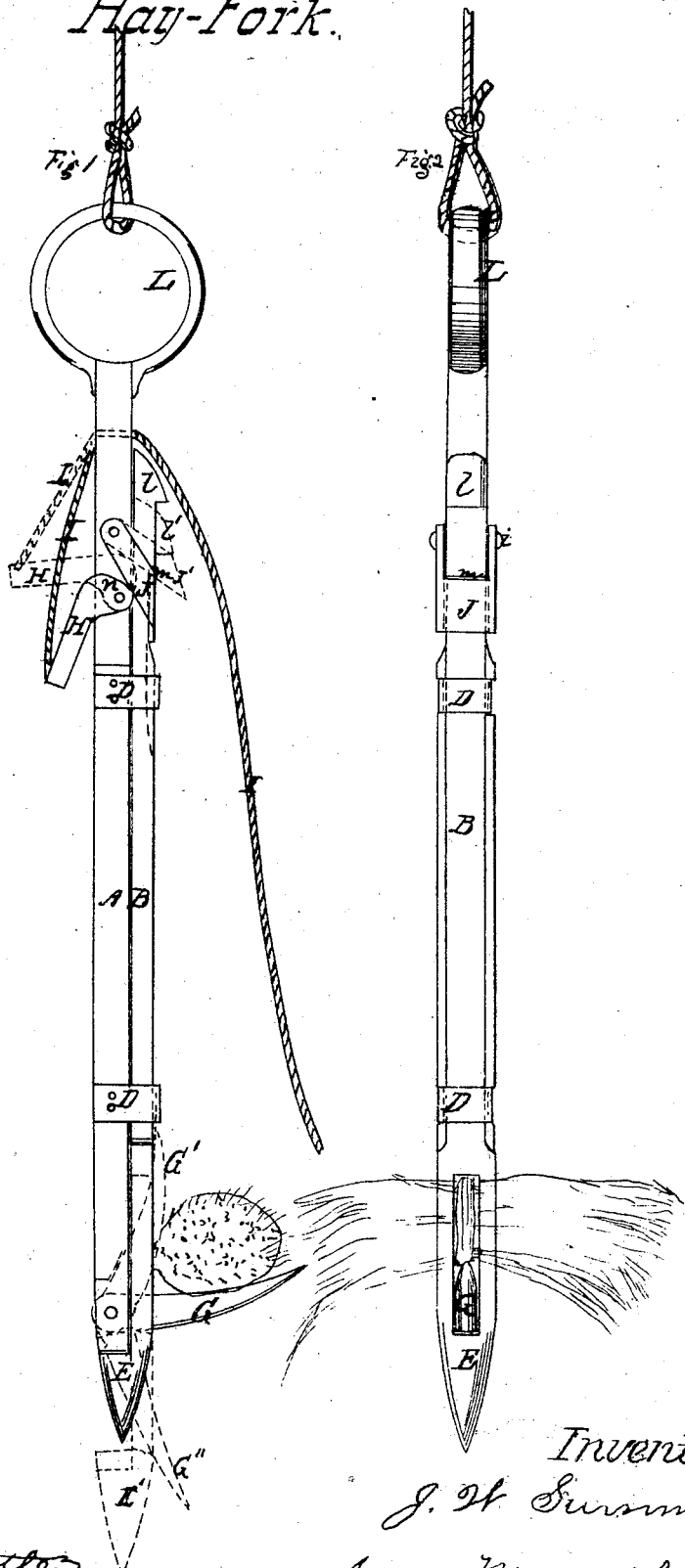

J. W. SUMMERS, OF SANDY HILL, NEW YORK.

Letters Patent No. 75,997, dated March 24, 1868.

IMPROVEMENT IN HORSE HAY-FORKS.

*The Schedule referred to in these Letters Patent and making part of the same.*

TO ALL WHOM IT MAY CONCERN:

Be it known that I, J. W. SUMMERS, of Sandy Hill, in the county of Washington, and State of New York, have invented a new and improved Hay-Fork or Harpoon; and I do hereby declare that the following is a full, clear, and exact description thereof, which will enable those skilled in the art to make and use the same, reference being had to the accompanying drawings, forming part of this specification, in which—

Figures 1 and 2 are corresponding elevations of my improved hay-fork.

Similar letters of reference indicate corresponding parts.

This invention consists of a simple and effective arrangement of parts, which produce a cheap and effective hay-fork.

The part or shank A terminates at the top in a ring, L, to which is affixed the hoisting-rope, as shown. To the bottom is pivoted a single point or tine, which folds upward, as shown at G', and lies close to the shank B when the fork is being thrust into the hay, a slot in the latter shank permitting the said upward folding of the tine G. The lower end of the shank A is an open mortise, to permit the desired freedom of the tine to fold upward, or fall downward when the hay is to be discharged from the fork. The shank B slides in contact with the shank A, and within sheet-metal bands affixed to the latter, as shown.

When the harpoon is thrust down into the hay, the slot in the shank B permits the tine to fold up against the shank, as shown at G', so that it presents no obstacle to the descent of the harpoon, but when the latter is being withdrawn, the point of the said tine clutches in the hay and is drawn out to a horizontal position, as shown, whereby it brings up a quantity of the hay with it.

A sheet-metal loop, J, pivoted to the shank A, catches under the shoulder $m$ on the shank B, and holds them together in the position, as shown. The shank B terminates in a part, E, which latter furnishes a shoulder for the lower end of the shank A to rest against when the harpoon is thus set, so that a smooth entering-point is provided. A cam-loop, H, is pivoted to the shank A, in such a position that the cam-edges $n$ of the loop are in contact with the proximate edges of the loop J, as shown. To the cam-loop H is affixed a cord or line, I, which leads over and through a hole in the shank A, as shown.

When the cord is pulled, the cam-loop is raised, so that its cam-edges $n$ act against the catch-loop J, and lift it out from against the notch or shoulder $m$, whereby the shank B slides downward, which movement throws the tine G to the position G'', which discharges the hay it supported. A notch, $l$, prevents the shank B from falling entirely out from the bands D.

This harpoon is durable, cheap, and effective.

I claim as new, and desire to secure by Letters Patent—

The shanks A and B, the single tine G, bands D D, cam-loop H, catch-loop J, notches $l$ and $m$, and cord I, all constructed and operating substantially as shown and described, and for the purposes set forth.

The above specification of my invention signed by me, this 30th day of January, 1868.

J. W. SUMMERS.

Witnesses:
JAMES F. MACE,
DANL. E. PARKS.